United States Patent
Wan et al.

(10) Patent No.: US 10,414,942 B2
(45) Date of Patent: Sep. 17, 2019

(54) ADHESIVE PROMOTERS AND METHODS FOR USE ON POLAR TEXTILE TO BOND NON-POLAR SUBSTRATES

(71) Applicant: Dow Global Technologies LLC, Midland, MI (US)

(72) Inventors: Qichun Wan, Midland, MI (US); Stephanie K. Anderson, Midland, MI (US); Patricia A. Peart, Ponca City, OK (US); Kyle D. Anderson, Freeport, TX (US); Yongfu Li, Midland, MI (US); Colin LiPiShan, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 60 days.

(21) Appl. No.: 15/740,472

(22) PCT Filed: May 26, 2016

(86) PCT No.: PCT/US2016/034251
§ 371 (c)(1),
(2) Date: Dec. 28, 2017

(87) PCT Pub. No.: WO2017/003600
PCT Pub. Date: Jan. 5, 2017

(65) Prior Publication Data
US 2018/0187040 A1 Jul. 5, 2018

Related U.S. Application Data

(60) Provisional application No. 62/186,682, filed on Jun. 30, 2015.

(51) Int. Cl.
| | |
|---|---|
| C09J 153/02 | (2006.01) |
| C09J 151/06 | (2006.01) |
| C09D 153/02 | (2006.01) |
| C09D 151/06 | (2006.01) |
| C09D 153/00 | (2006.01) |
| C08G 18/69 | (2006.01) |
| C08G 18/76 | (2006.01) |
| C08G 18/77 | (2006.01) |
| C09D 151/00 | (2006.01) |
| C08G 18/10 | (2006.01) |
| C08G 18/32 | (2006.01) |
| C09J 151/00 | (2006.01) |
| C08L 51/00 | (2006.01) |
| B32B 27/32 | (2006.01) |
| B32B 5/02 | (2006.01) |
| B32B 7/12 | (2006.01) |
| B32B 27/12 | (2006.01) |
| C09D 5/00 | (2006.01) |
| C08K 5/29 | (2006.01) |
| C08L 23/08 | (2006.01) |

(52) U.S. Cl.
CPC ............ *C09D 153/005* (2013.01); *B32B 5/02* (2013.01); *B32B 7/12* (2013.01); *B32B 27/12* (2013.01); *B32B 27/32* (2013.01); *C08G 18/10* (2013.01); *C08G 18/3206* (2013.01); *C08G 18/692* (2013.01); *C08G 18/7671* (2013.01); *C08G 18/776* (2013.01); *C08L 51/006* (2013.01); *C09D 5/002* (2013.01); *C09D 151/006* (2013.01); *C09D 151/06* (2013.01); *C09D 153/025* (2013.01); *C09J 151/006* (2013.01); *C09J 151/06* (2013.01); *C09J 153/025* (2013.01); *B32B 2255/02* (2013.01); *B32B 2255/26* (2013.01); *B32B 2262/0261* (2013.01); *B32B 2262/0276* (2013.01); *C08K 5/29* (2013.01); *C08L 23/0815* (2013.01); *C08L 2205/02* (2013.01); *C08L 2666/36* (2013.01); *C08L 2666/42* (2013.01)

(58) Field of Classification Search
None
See application file for complete search history.

(56) References Cited

U.S. PATENT DOCUMENTS

| | | | |
|---|---|---|---|
| 4,058,647 A | 11/1977 | Inoue et al. | |
| 4,198,327 A | 4/1980 | Matsumoto et al. | |
| 4,588,648 A | 5/1986 | Krueger et al. | |
| 5,061,572 A | 10/1991 | Hamada et al. | |
| 5,242,977 A | 9/1993 | Franke et al. | |
| 5,741,594 A | 4/1998 | Jialanella | |
| 2005/0106965 A1 | 5/2005 | Wevers et al. | |
| 2007/0275200 A1* | 11/2007 | Kato | B32B 37/24 428/40.1 |
| 2014/0256867 A1 | 9/2014 | Puerkner et al. | |
| 2014/0335299 A1 | 11/2014 | Wang et al. | |

* cited by examiner

*Primary Examiner* — David J Buttner
(74) *Attorney, Agent, or Firm* — Husch Blackwell LLP

(57) ABSTRACT

The present disclosure provides a primer composition. In an embodiment, the primer composition includes a functionalized polyolefin, a functionalized styrenic block copolymer containing greater than or equal to 20 wt % polymerized styrene, a solvent composition and an isocyanate component. The primer composition is suitable for use as an adhesive layer between a substrate and a polyolefin layer.

10 Claims, No Drawings

ADHESIVE PROMOTERS AND METHODS FOR USE ON POLAR TEXTILE TO BOND NON-POLAR SUBSTRATES

REFERENCE TO RELATED APPLICATIONS

This application claims priority to U.S. Patent Application Ser. No. 62/186,682, filed on 30 Jun. 2015, and the entire content of which is incorporated by reference herein.

BACKGROUND

Polyethylene, polypropylene, and polyolefin polymers have numerous applications in food package, pipes, stretches, bottles and bags. However, the low surface energy and low polarity of polyolefins greatly limit their applications when properties such as printing, painting or adhesion are required.

Conventional methods to improve the adhesion and printability of polyolefins include bulk modification by blending with polar polymers and surface modification by means of physical and chemical treatments. Such treatments include some simple means such as solvent clean-up (or wiping), surface roughening by sand paper, acid treatment and base treatment, to some more sophisticated treatments such as plasma, corona and flame treatments. Some of these treatments lengthen processing time and require a more complicated processing method.

Conventional methods also include adhesive compositions including an organic solvent and a functionalized polyolefin, but a need remains for an adhesive composition with further improved adhesion. Functionalized and non-functionalized styrenic block copolymers have been used in hot melt adhesives and as primers for rubbers. However, they generally do not exhibit sufficient adhesion with polyethylene- or polypropylene-containing polyolefins, when compared to functionalized polyolefins.

A need exists to find simple solutions to improve the adhesion of a polyolefin with itself or with other polar or non-polar substrates. A need further exists to find solutions to provide balanced adhesion, easy processability and flexibility to an article. A need also exists for a primer composition that is easy to process and may be stored or applied to a substrate at room temperature.

SUMMARY

The present disclosure provides a primer composition. In an embodiment, the primer composition contains a functionalized styrenic block copolymer containing greater than or equal to 20 wt % polymerized styrene, a functionalized polyolefin, a solvent composition containing a hydrocarbon solvent and an isocyanate component selected from (i) an isocyanate compound, (ii) an isocyanate end-capped prepolymer and (iii) combinations thereof.

The present disclosure provides an article. In an embodiment, the article includes at least one component formed from the primer composition. In another embodiment, the article further comprises a substrate.

The present primer composition improves the adhesion of a polyolefin with itself or with other polar or non-polar substrates, evidenced by improved peel strength in articles containing the present primer composition between a substrate and a polyolefin layer. The present primer composition also provides improved processability because it may be prepared, stored and applied at room temperature without adversely affecting the adhesive properties of the composition. Moreover, the present primer composition advantageously has sufficient penetration into a substrate. Furthermore, the present primer composition wets with high adhesion for difficult-to-bond substrates. The present primer composition also provides improved flexibility to articles containing the primer composition. Another advantage of the present primer composition is that using functional polymer blends as adhesives can provide balanced adhesion, easy processability and flexibility. Such primer compositions which improve adhesion between a fabric and a polyolefin have not been reported.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 5), any subrange between any two explicit values is included (e.g., 1 to 2; 2 to 3; 3 to 5, etc.).

Unless stated to the contrary, implicit from the context, or customary in the art, all parts and percents are based on weight, and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Density is measured in accordance with ASTM D792, Method B (g/cc or g/cm$^3$).

Solution viscosity is measured in a solution of toluene and 25 wt % polymer at 25° C. in accordance with BAM 922. The result is recorded in Pa·s.

Brookfield viscosity is measured using a Brookfield DV-I Prime Viscometer. The spindle selection depends on the viscosity of the sample. For samples that are more viscous, or gelled, spindle TF96 is used. For samples that are less viscous, either spindle LV62 or LV63 are used. The viscosity measurement is recorded after 15 seconds at 23° C. The spindle is cleaned between measurements. Brookfield viscosity is measured at 100 rounds per minute (rpm) and is reported in centipoise (cP).

Melt index (MI) is measured in accordance with ASTM D1238, Condition 190° C./2.16 kilogram (kg) weight, also known as $I_2$, and is reported in g/10 min.

Melt Flow (MF) for the styrenic block copolymer is measured in accordance with ASTM D1238, Condition 200° C. or 230° C./5.0 kilogram (kg) weight and is reported in g/10 min.

Isocyanate group (NCO) content by weight is measured in accordance with ASTM D5155.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains a majority mole percent polymerized olefin monomer (based on total amount of polymerizable monomers), and optionally, may contain at least one comonomer. Nonlimiting examples of olefin-based polymer include ethylene-based polymer and propylene-based polymer. Representative polyolefins include polyethylene, polypropylene, polybutene, polyisoprene and their various interpolymers.

An "ethylene-based polymer" or "ethylene polymer" is a polymer that contains a majority amount of polymerized ethylene based on the weight of the polymer and, optionally, may comprise at least one comonomer. Ethylene-based polymers typically comprise at least 50 mole percent (mol %) units derived from ethylene (based on the total amount of polymerizable monomers).

A "propylene-based polymer" is a polymer that contains a majority amount of polymerized propylene based on the weight of the polymer and, optionally, may comprise at least one comonomer. Propylene-based polymers typically comprise at least 50 mole percent (mol %) units derived from propylene (based on the total amount of polymerizable monomers).

An "ethylene/α-olefin interpolymer" is an interpolymer that contains a majority amount of polymerized ethylene based on the weight of the interpolymer and at least one α-olefin.

An "ethylene/α-olefin copolymer" is an interpolymer that contains a majority amount of polymerized ethylene based on the weight of the interpolymer and an α-olefin, as the only two monomer types.

DETAILED DESCRIPTION

Primer Composition

The present disclosure provides a primer composition. In an embodiment, the primer composition includes:
  (A) a functionalized styrenic block copolymer;
  (B) a functionalized polyolefin;
  (C) a solvent composition comprising a hydrocarbon solvent; and
  (D) an isocyanate component selected from (i) an isocyanate compound, (ii) an isocyanate end-capped pre-polymer and (iii) combinations thereof.

A. Functionalized Styrenic Block Copolymer

The present primer composition includes a functionalized styrenic block copolymer. A "styrenic block copolymer" is an elastomer having at least one block segment of a styrenic monomer in combination with another block segment of another comonomer. The styrene block copolymers can be of the linear or radial type, or of the diblock or triblock type.

Nonlimiting examples of suitable styrenic block copolymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Styrenic block copolymers are available from Dexco Polymers under the trademark VECTOR®, from Kraton Corporation under the trademark KRATON® (e.g., KRATON® FG1901 G), and from Dynasol, under the trademark SOLPRENE® 4114A, 4213A, and the like.

The functionalized styrenic block polymer comprises a functional group. Such a functional group is grafted pendant to the polymer chain. The functional group may also be incorporated through copolymerization of a suitable monomer containing the desired functional group. Examples of suitable functional groups include halo, particularly chloro and bromo, hydroxyl, carboxyl, carbonyl, phosphono, acid anhydride, amino, epoxy, mercapto, sulfate, sulfonate, amido, and ester groups.

In an embodiment, carboxyl groups are grafted onto a preformed styrenic block copolymer. In another embodiment, acid anhydride groups are grafted onto a preformed styrenic block copolymer. Nonlimiting examples of unsaturated carboxylic acid and acid anhydride compounds that can be grafted onto the preformed styrenic block copolymer include maleic acid, fumaric acid, itaconic acid, acrylic acid, methacrylic acid, crotonic acid, maleic anhydride, and itaconic anhydride.

In an embodiment, the functionalized styrenic block copolymer is selected from anhydride-functionalized styrenic block copolymer, carboxylic-acid-functionalized styrenic block copolymer, hydroxy-functionalized styrenic block copolymer, amine-functionalized styrenic block copolymer and combinations thereof. In an embodiment, the functionalized styrenic block copolymer is a maleic-anhydride-functionalized styrenic block copolymer.

In an embodiment, the functionalized styrenic block copolymer contains greater than 13 wt % polymerized styrene, or from greater than or equal to 20 wt %, 25 wt %, 30 wt %, 35 wt % or 40 wt % to 45 wt % 50 wt % 55 wt % or 60 wt % polymerized styrene, based on the weight of the functionalized styrenic block polymer.

In an embodiment, the functionalized styrenic block copolymer contains from greater than 0 wt %, 0.05 wt %, 0.1 wt %, 0.5 wt % or 1.0 wt % to 1.1 wt %, 1.5 wt %, 1.7 wt %, 2.0 wt %, 2.5 wt %, 3.0 wt %, 3.5 wt %, 4.0 wt %, 4.5 wt % or 5.0 wt % of the of the functional group, based on the weight of the functionalized styrenic block copolymer. In an embodiment, the functionalized styrenic block copolymer contains from 1.0 wt % to 1.7 wt % of the functional group, based on the weight of the functionalized styrenic block copolymer.

In an embodiment, the functionalized styrenic block copolymer is a styrene-ethylene/butylene-styrene block copolymer (SEBS) containing 30 wt % polymerized styrene and 1.0 wt % maleic anhydride, based on the weight of the functionalized styrenic block copolymer.

In an embodiment, the functionalized styrenic block polymer has a solution viscosity from 4 Pa·s, 5 Pa·s, 6 Pa·s, 7 Pa·s, 8 Pa·s or 9 Pa·s to 10 Pa·s, 11 Pa·s, 12 Pa·s, 13 Pa·s, 14 Pa·s, 15 Pa·s, 16 Pa·s, 17 Pa·s, 18 Pa·s or 19 Pa·s, measured in a solution of toluene and 25 wt % functionalized styrenic block copolymer at 25° C.

In an embodiment, the functionalized styrenic block polymer has a melt flow (MF) of from 5 g/10 min, 6 g/10 min, 7 g/10 min or 8 g/10 min to 9 g/10 min, 10 g/10 min or 11 g/10 min, measured in accordance with ASTM D1238, Condition 200° C. or 230° C./5.0 kg weight.

In an embodiment, the functionalized styrenic block polymer has a polystyrene apparent molecular weight ($M_w$) of from 50,000 g/mol or 100,000 g/mol to 125,000 g/mol, 150,000 g/mol or 250,000 g/mol.

In an embodiment, the functionalized styrenic block polymer has a molecular weight distribution ($M_w/M_n$) of from 1.00, 1.10, 1.20, 1.30, 1.40, 1.50 or 1.60 to 1.70, 1.80, 1.90, 2.00 or 2.10. In an embodiment, the functionalized styrenic block polymer has a molecular weight distribution ($M_w/M_n$) of from 1.60 to 2.00.

The present functionalized styrenic block copolymer may comprise two or more embodiments discussed herein.

B. Functionalized Polyolefin

The present primer composition includes a functionalized polyolefin.

In an embodiment the polyolefin is selected from an ethylene-based polymer and a propylene-based polymer. In an embodiment, the polyolefin is an ethylene-based polymer. In a further embodiment, the polyolefin is selected from an ethylene/α-olefin interpolymer and an ethylene/α-olefin copolymer. Representative α-olefins include, but are not limited to, $C_3$-$C_{20}$ α-olefins, or $C_3$-$C_{10}$ α-olefins, or $C_4$-$C_{20}$ α-olefins, or $C_4$-$C_{10}$ α-olefins. Representative α-olefins include propylene, 1-butene, 1-pentene, 1-hexene, 1-heptene and 1-octene.

The functionalized polyolefin comprises a functional group. In an embodiment, the functional group is grafted pendant to the polymer chain. The functional group may also be incorporated through copolymerization of a suitable monomer containing the desired functional group. Examples of suitable functional groups include halo, particularly chloro and bromo, hydroxyl, carboxyl, carbonyl, phosphono, acid anhydride, amino, amine, imide, epoxy, mercapto, sulfate, sulfonate, amido, and ester groups. Examples of unsaturated carboxylic acid and acid anhydride compounds that can be grafted onto the preformed polyolefin include maleic acid, fumaric acid, itaconic acid, acrylic acid, methacrylic acid, crotonic acid, maleic anhydride, and itaconic anhydride.

In an embodiment, the functionalized polyolefin is selected from an anhydride-functionalized polyolefin, a carboxylic-acid-functionalized polyolefin and combinations thereof. In an embodiment, the functionalized polyolefin is selected from anhydride-functionalized polyolefin, a carboxylic-acid-functionalized polyolefin, an amine-functionalized polyolefin, an imide-functionalized polyolefin, a hydroxyl-functionalized polyolefin and combinations thereof.

In an embodiment, the functionalized polyolefin is a maleic-anhydride functionalized ethylene/α-olefin interpolymer. In a further embodiment, the functionalized polyolefin is a maleic-anhydride functionalized ethylene/octene interpolymer.

Nonlimiting examples of suitable functionalized polyolefins include maleic anhydride (MAH)-grafted copolymers (for example, AFFINITY™ GA 1000R and AMPLIFY™ GR 216, available from The Dow Chemical Company).

In an embodiment, the functionalized polyolefin contains from greater than 0 wt %, 0.01 wt %, 0.02 wt %, 0.03 wt %, 0.04 wt % or 0.05 wt % to 0.06 wt %, 0.07 wt %, 0.08 wt %, 0.09 wt %, 0.1 wt %, 0.2 wt %, 0.5 wt %, or 1 wt % to 1.5 wt %, 2 wt %, 5 wt %, 10 wt %, 15 wt %, or 20 wt % of the functional group, based on the weight of the functionalized polyolefin. In an embodiment, the functionalized polyolefin contains from greater than 0 wt % to less than 1.5 wt % of the functional group, based on the weight of the functionalized polyolefin.

In an embodiment, the functionalized polyolefin has a density of from 0.870 g/cc or 0.875 g/cc to 0.878 g/cc or 0.902 g/cc.

In an embodiment, the functionalized polyolefin has a melt index (MI) of from 1.0 g/10 min, 1.3 g/10 min, 5 g/10 min, 10 g/10 min, 15 g/10 min, 20 g/10 min, 50 g/10 min, 100 g/10 min, or 200 g/10 min to 300 g/10 min, 400 g/10 min, 500 g/10 min, 600 g/10 min, 700 g/10 min, 800 g/10 min, 900 g/10 min, or 1000 g/10 min.

In an embodiment, the functionalized polyolefin has a melting point ($T_m$) of from 25° C., 30° C., 40° C., 50° C., 60° C., or 65° C. to 70° C., 80° C., 90° C., 100° C., 110° C., 120° C., 130° C., or 140° C. In a further embodiment, the functionalized polyolefin has a $T_m$ from 50° C. to 90° C.

In an embodiment, the functionalized polyolefin has a glass transition temperature ($T_g$) of from −80° C., −70° C., −60° C., −58° C. or −56° C. to −54° C., −52° C., −50° C., −40° C., −30° C. or −20° C. In a further embodiment, the functionalized polyolefin has a $T_g$ of from −58° C. to −40° C.

The present functionalized polyolefin may comprise two or more embodiments discussed herein.

C. Solvent Composition

The present primer composition includes a solvent composition. The solvent composition contains a hydrocarbon solvent. In an embodiment, the solvent composition optionally includes a polar solvent.

The hydrocarbon solvent contains only hydrogen and carbon atoms, including branched or unbranched, saturated or unsaturated, cyclic, polycyclic or acyclic species, and combinations thereof. In an embodiment, the hydrocarbon solvent is selected from aromatic hydrocarbon solvents, aliphatic hydrocarbon solvents, and combinations thereof.

An aromatic hydrocarbon is a hydrocarbon that contains one or more benzene rings. Nonlimiting examples of aromatic hydrocarbon solvents include toluene and xylene. In an embodiment, the hydrocarbon solvent is an aromatic hydrocarbon solvent that is toluene.

An aliphatic hydrocarbon is a hydrocarbon that is an alkane, an alkene, an alkyne, or a derivative of an alkane, an alkene or an alkyne. Nonlimiting examples of aliphatic hydrocarbon solvents include hexene, cyclohexane and methylcyclohexane (MCH). In an embodiment, the hydrocarbon solvent is an aliphatic hydrocarbon solvent containing methylcyclohexane (MCH).

The present hydrocarbon solvent may comprise two or more embodiments discussed herein.

A polar solvent is a solvent in which there is a either a permanent separation of positive and negative charges in the solvent molecules, or the centers of positive and negative charges do not coincide. A polar solvent has a polar plus hydrogen bonding portion greater than 0, as opposed to hydrocarbon solvents in which the polar plus hydrogen bonding portion is 0. Nonlimiting examples of polar solvents include alcohols, ketones and esters. In an embodiment, the polar solvent is a ketone. Nonlimiting examples of suitable ketones include acetone, methyl ethyl ketone and cyclohexanone.

In an embodiment, the polar solvent is an ester. Nonlimiting examples of suitable esters include butyl acetate and ethyl acetate.

The present polar solvent may comprise two or more embodiments discussed herein.

In an embodiment, the solvent composition contains from 0 wt %, 0.5 wt %, 1 wt %, 5 wt % or 10 wt % to 15 wt %, 18 wt %, 20 wt %, 30 wt %, 35 wt % or 40 wt % of the polar solvent and from 60 wt %, 65 wt %, 70 wt %, 75 wt %, 80 wt %, 85 wt % or 90 wt % to 95 wt % or 100 wt % of the hydrocarbon solvent, based on the total weight of the solvent composition. In an embodiment, the solvent composition contains from 0.5 wt % to 20 wt % of the polar solvent and from 80 wt % to 99.5 wt % of the hydrocarbon solvent, based on the total weight of the solvent composition.

The present solvent composition may comprise two or more embodiments discussed herein.

D. Isocyanate Component

The present primer composition contains an isocyanate component selected from (i) an isocyanate compound, (ii) an isocyanate end-capped pre-polymer and (iii) combinations thereof.

An isocyanate is a chemical that contains at least one isocyanate group in its structure. An isocyanate group (or NCO) is represented by the formula: —N=C=O.

An isocyanate that has two isocyanate groups is a di-isocyanate and an isocyanate that has three isocyanate groups is a tri-isocyanate, etc. An isocyanate may be aromatic or aliphatic. In an embodiment, the isocyanate component is selected from a mono-isocyanate, a di-isocyanate, a tri-isocyanate and combinations thereof.

In an embodiment, the primer composition contains a multifunctional isocyanate component with at least two isocyanate groups, or at least three isocyanate groups.

In an embodiment, the isocyanate component has a NCO content by weight from 7 wt %, 10 wt %, or 15 wt % to 20 wt %, 30 wt %, 40 wt %, or 50 wt % measured in accordance with ASTM D5155.

In an embodiment, the isocyanate component optionally is used in the presence of a catalyst. Suitable catalysts include divalent or tetravalent organotin catalysts such as dimethyltin dilaurate, dimethyltin dicarboxylate, dimethyltin dimercaptide and stannous octoate, or amine catalysts. In an embodiment, the primer composition contains from 0 wt %, 0.01 wt %, 0.8 wt %, or 0.5 wt % to 1 wt %, or 2 wt % of a catalyst, based on the total weight of the primer composition.

The present isocyanate component may comprise two or more embodiments discussed herein.

i. Isocyanate Compound

In an embodiment, the present primer composition contains an isocyanate component that is an isocyanate compound.

In an embodiment, the isocyanate compound is an isocyanate monomer.

An isocyanate monomer is a molecule that contains at least one isocyanate group and may chemically bind to other molecules to form a pre-polymer or a polymer.

Nonlimiting examples of isocyanate monomers include isophorone diisocyanate (for example, IPDI, available from Vencorex Chemicals), toluene diisocyanate (for example, VORANATE™ T-80 TDI, available from The Dow Chemical Company), methylene di-p-phenylene isocyanate (MDI), tris(p-isocyanatophenyl) thiophosphate (for example, DESMODUR™ RFE, available from Bayer MaterialScience) and ROBOND™ L-100/CR 9-101 Laminating Adhesive (available from The Dow Chemical Company).

In an embodiment, the isocyanate compound contains at least two isocyanate groups. In a further embodiment, the isocyanate compound contains at least three isocyanate groups.

The present isocyanate compound may comprise two or more embodiments discussed herein.

ii. Isocyanate End-Capped Pre-Polymer

In an embodiment, the present primer composition contains an isocyanate component that is an isocyanate end-capped pre-polymer.

An isocyanate end-capped pre-polymer is the reaction product of a monomer or system of monomers that contains at least one isocyanate group. A pre-polymer is a liquid intermediate between monomers and a final polymer. In an embodiment, polyurethane pre-polymers are formed by combining an excess amount of di-isocyanate with polyols.

Nonlimiting examples of isocyanate end-capped pre-polymers include the reaction product of diphenylmethane diisocyanate and glycol (for example, ISONATE™ 181 MDI Prepolymer, available from The Dow Chemical Company).

The present isocyanate end-capped pre-polymer may comprise two or more embodiments discussed herein.

E. Additive

The present primer composition may include one or more additives.

Additives include, but are not limited to, adhesives such as an epoxy resin, urethane, latex, acrylate, an elastomer-solvent cement, gum, polysilicone, tackifier resins, thickeners, dyes/pigments and inorganic fillers.

The present additive may comprise two or more embodiments discussed herein.

F. Primer Composition

The present disclosure provides a primer composition. In an embodiment, the primer composition includes: (A) a functionalized styrenic block copolymer; (B) a functionalized polyolefin; (C) a solvent composition comprising a hydrocarbon solvent; and (D) an isocyanate component selected from (i) an isocyanate compound, (ii) an isocyanate end-capped pre-polymer and (iii) combinations thereof.

The functionalized styrenic block copolymer, functionalized polyolefin, solvent composition and isocyanate component may be any respective functionalized styrenic block copolymer, functionalized polyolefin, solvent composition and isocyanate component disclosed herein. In an embodiment, the primer composition contains from 1 wt %, 3 wt %, 5 wt %, 10 wt % or 12 wt % to 15 wt %, 18 wt % or 20 wt % of the functionalized styrenic block copolymer, based on the total weight of the primer composition. In an embodiment, the primer composition contains from 1 wt %, 3 wt %, 5 wt %, or 10 wt % to 12 wt %, 15 wt %, 18 wt %, or 20 wt % of the functionalized polyolefin, based on the total weight of the primer composition. In an embodiment, the primer composition contains from 55wt %, 60 wt %, 65 wt %, 70 wt %, 75 wt %, or 80 wt % to 85 wt %, 90 wt %, 95 wt %, or 97.9 wt % of the solvent composition, based on the total weight of the primer composition. In an embodiment, the primer composition contains from 0.1 wt %, 0.2 wt %, 0.3 wt %, 0.4 wt %, 0.5 wt %, 0.9 wt %, 1 wt %, 2 wt %, or 3 wt % to 3 wt %, 4 wt %, or 5 wt % of the isocyanate component, based on the total weight of the primer composition. In an embodiment, the primer composition contains from 0.4 wt % to 1 wt % of the isocyanate component, based on the total weight of the primer composition. In an embodiment, the primer composition contains from 1 wt % to 20 wt % functionalized styrenic block copolymer, from 1 wt % to 20 wt % functionalized polyolefin, from 55 wt % to 97.9 wt % solvent composition, and from 0.1 wt % to 5 wt % isocyanate component, based on the total weight of the primer composition. The primer composition optionally contains an additive. In an embodiment, the primer composition contains from 0.1 wt %, 0.5 wt %, 1 wt %, 5 wt %, 10 wt % or 15 wt % to 5 wt %, 10 wt %, 15 wt % or 20 wt % additive, based on the weight of the primer composition.

In an embodiment, the weight ratio of the functionalized styrenic block polymer to the functionalized polyolefin, in the primer composition, is 90:10, 85:15, 75:25, or 50:50 to 25:75, or 10:90.

In an embodiment, the weight ratio of the total polymer content (functionalized styrenic block copolymer and functionalized polyolefin) to the solvent composition in the primer composition is 40:60, 30:70, or 20:80 to 15:85, 20:80, 10:90 to 5:95.

In an embodiment, the weight ratio of the total polymer content (functionalized styrenic block copolymer and functionalized polyolefin) to the isocyanate component in the primer composition is 99.9:0.1, 99:1, 98:2, or 95:5 to 90:10, 80:20, or 25:75. In an embodiment, the weight ratio of the total polymer content (functionalized styrenic block copolymer and functionalized polyolefin) to the isocyanate component in the primer composition is from 75:25 to 25:75.

In an embodiment, the primer composition has a Brookfield Viscosity of from 20 cP, 50 cP, 100 cP, 200 cP, or 300 cP to 400 cP, 500 cP, 1000 cP, 2000 cP, 3000 cP, 4000 cP, or 5000 cP. In an embodiment, the primer composition has a Brookfield Viscosity from 20 cP, 50 cP, 100 cP, 200 cP, or 300 cP to less than 4000 cP, less than 5000 cP, less than 6000 cP, less than 7,000 cP, or less than 8,000 cP.

In an embodiment, a pre-primer composition is prepared by mixing the functionalized polyolefin with a solvent composition containing a hydrocarbon solvent at a temperature above the highest melting point of the functionalized polyolefin in order to dissolve the functionalized polyolefin under agitation for 1 or 2 hours and separately mixing the functionalized styrenic block copolymer with a solvent composition containing a hydrocarbon solvent at a temperature above the highest melting point of the functionalized styrenic block copolymer in order to dissolve the functionalized polyolefin under agitation for 1 or 2 hours, and then mixing the two solutions together at room temperature ("Cold Blending") or at a temperature of at least 80° C. ("Hot Blending") to form a "pre-primer composition."

In an embodiment, the pre-primer composition is prepared by mixing the functionalized polyolefin and functionalized styrenic block copolymer with a solvent composition containing a hydrocarbon solvent at a temp. above the highest melting point of the functionalized polyolefin in order to dissolve the functionalized polyolefin and functionalized styrenic block copolymer under agitation for 1 or 2 hours to form a "pre-primer composition."

In an embodiment, the pre-primer composition is prepared by adding the functionalized polyolefin and functionalized styrenic block copolymer as polymer pellets ("Polymer Pellets Blending") into a solvent composition containing a hydrocarbon solvent, heating to a temperature of at least 80° C., and agitating the solution for 1 or 2 hours, in order to dissolve the functionalized polyolefin and functionalized styrenic block copolymer, to form a "pre-primer composition."

In an embodiment, the pre-primer composition has a Brookfield Viscosity from 10 cP, 25 cP, 50 cP, 75 cP, or 100 cP to less than 4000 cP, less than 5000 cP, less than 6000 cP, less than 7,000 cP, or less than 8,000 cP.

After the pre-primer composition is prepared, the isocyanate component is mixed with the pre-primer composition to form the primer composition. In an embodiment, the isocyanate component is dissolved in a suitable solvent such as monochlorobenzene or ethyl acetate prior to mixing the isocyanate component with the pre-primer composition.

In the primer composition, the isocyanate composition will react with any residual water (moisture), hydroxyl groups, amines, maleic anhydride, or carboxylic acid. Depending on the type of isocyanate component used and the functional groups/amounts in the functionalized polyolefin and functionalized styrenic block copolymer, the reaction may be fast or slow.

In an embodiment, the isocyanate component is mixed with the pre-primer solution just before the primer composition is applied to a substrate.

Advantageously, the functionalized styrenic block copolymer, functionalized polyolefin and isocyanate component remain dissolved in the solvent of the primer composition, even when the temperature of the primer composition is reduced to room temperature, allowing the primer composition (and the pre-primer composition) to be used at room temperature. The ability to be used at room temperature is advantageous for easy processing because no special precautions are necessary to keep the primer composition (or pre-primer composition) hot or to apply it hot to the substrate.

In an embodiment, the primer composition comprises:
(A) from 1 wt % to 20 wt % of a functionalized styrenic block copolymer comprising greater than, or equal to, 30 wt % polymerized styrene;
(B) from 1 wt % to 20 wt % of a functionalized ethylene/α-olefin interpolymer;
(C) from 55 wt % to 97.9 wt % of a solvent composition comprising a hydrocarbon solvent; and
(D) from 0.1 wt % to 5 wt % of an isocyanate component selected from the group consisting of (i) an isocyanate compound, (ii) an isocyanate end-capped pre-polymer and (iii) combinations thereof;
wherein the primer composition has one, some, or all of the following properties:
(1) a Brookfield Viscosity from 20 cP to less than 8,000 cP;
(2) a weight ratio of functionalized styrenic block polymer to functionalized polyolefin from 90:10 to 10:90;
(3) a weight ratio of total polymer content to solvent composition from 40:60 to 5:95; and (4) a weight ratio of total polymer content to isocyanate component from 99.9:0.1 to 25:75.

In an embodiment, the primer composition is formed from a pre-primer composition comprising:
(A) 1 wt % to 20 wt % of a functionalized styrenic block copolymer comprising greater than, or equal to, 30 wt % polymerized styrene;
(B) 1 wt % to 20 wt % of a functionalized ethylene/α-olefin interpolymer; and
(C) 55 wt % to 97.9 wt % of a solvent composition comprising a hydrocarbon solvent;
wherein the pre-primer composition has a Brookfield Viscosity from 10 cP to 4,000 cP, or 5,000 cP; and
(D) 0.1 wt % to 5 wt % of an isocyanate component selected from the group consisting of (i) an isocyanate compound, (ii) an isocyanate end-capped pre-polymer and (iii) combinations thereof, based on the total amount of the primer composition.

The present primer composition may comprise two or more embodiments discussed herein.

Article

The present disclosure provides an article.

In an embodiment, the article includes: (1) a substrate; and (2) a coating on the substrate, the coating formed from the primer composition disclosed herein.

In an embodiment, the article further includes a polyolefin layer, wherein the polyolefin layer is at least partially in contact with the coating on the substrate. In another embodiment, the coating is an adhesive layer.

In another embodiment, the article includes at least one component formed from the primer composition disclosed herein. In a further embodiment, the article further comprises a substrate.

G. Substrate

In an embodiment, the present article includes a substrate.

Nonlimiting examples of suitable substrates include film, sheets and fabric. The substrate may be polar or non-polar.

In an embodiment, the substrate is a film. In an embodiment, the film is a polyolefin film. Nonlimiting examples of polyolefin film include films containing ethylene-based polymer or films containing propylene-based polymer. Nonlimiting examples of ethylene-based polymers include ethylene/α-olefin copolymers and ethylene/α-olefin block copolymers.

In an embodiment, the substrate is a fabric. The fabric can be made of natural and/or man-made (i.e., synthetic) fibers. The fabric can be made of textile and/or industrial fibers. Nonlimiting examples of industrial fibers include glass, boron or carbon fibers, aromatic polyamide fibers, such as poly-p-phenyleneterephthalate known under the designation Kevlar®, silicon carbide fibers or mixtures thereof. Nonlimiting examples of textile fibers include wool, cotton, silk, linen, man-made fibers like regenerated cellulose, cellulose acetate (known under the trademark Rayon™), a polyamide, such as polyamide-6,6, an acrylonitrile homo-or copolymer, known under the trademarks Dralon™ or Orlon™, a polyethylene glycol terephthalate, a polyester such as polyethylene terephthalate (PET), a polyolefin, such as a polyethylene or polypropylene, or a mixture thereof.

In an embodiment, the substrate is a fabric composed of a polyamide. A nonlimiting example of a polyamide textile fiber is nylon. In an embodiment, a fabric containing a nylon polyamide fiber includes 100 wt % of the nylon fiber, or from 50 wt %, 55 wt %, 60 wt %, 65 wt % or 70 wt % to 75 wt %, 80 wt %, 85 wt %, 90 wt %, 95 wt % or 100 wt % of the nylon fiber, based on the total weight of the fabric.

In an embodiment, the substrate is a fabric composed of polyethylene terephthalate (PET).

In an embodiment, the fabric is woven or non-woven. In a nonwoven fabric, the fibers can, for example, be knitted, felted or bonded in any other way to produce a fabric. The fabric can be produced from fiber yarns, filament yarns, monofilaments, multifilaments or other fiber materials. In an embodiment, the fabric has a smooth surface. In a further embodiment, the fabric is roughened or slightly structured (for example, tufted, fibrous, velvety, napped, brushed or piled surfaces). Nonlimiting examples of textile fabrics with roughened or slightly structured surfaces include velvet, velour, plush, barchant or flannel fabrics. Woven fabrics can be tightly or loosely woven. The term "loosely woven," relates to a mesh fabric.

The fabric can be subjected to any finishing process, such as dying, pigmentation, bleaching, impregnating, decreasing flammability, or pretreatment with an adhesion or thermo-fixing agent.

In an embodiment, the fabric is dyed or un-dyed. The dye may be organic or inorganic dye. In an embodiment, a dyed fabric contains from greater than 0 wt %, 20 wt % 40 wt % or 50 wt % to 60 wt %, 70 wt %, or 80 wt % of a dye, based on the weight of the fabric. In an embodiment, the dyed fabric contains 60 wt % dye, based on the weight of the fabric.

In an embodiment, the substrate has a thickness of from 20 μm, 100 μm, 200 μm, 300 μm or 400 μm to 500 μm, 1000 μm, 1500 μm, 2000 μm or 3000 μm.

In an embodiment, the substrate has a unit weight of from 20 g/m$^2$, 60 g/m$^2$, 80 g/m$^2$, 100 g/m$^2$, 200 g/m$^2$ or 300 g/m$^2$ to 400 g/m$^2$, 600 g/m$^2$ or 800 g/m$^2$.

The present substrate may comprise two or more embodiments discussed herein.

H. Polyolefin Layer

In an embodiment, the present article includes a polyolefin layer including a polyolefin. In an embodiment, the polyolefin layer is at least partially in contact with the primer composition.

Non-limiting examples of polyolefins include ethylene-based polymers and propylene-based polymers. In an embodiment, the polyolefin layer includes polyolefins selected from olefin homopolymers, olefin copolymers, olefin interpolymers, olefin block copolymers, and combinations thereof.

In an embodiment, the polyolefin is a olefin block copolymer. Olefin block copolymers are available from The Dow Chemical Company under the trademark INFUSE™, (e.g., INFUSE™ 9500 and INFUSE™ 9817). In an embodiment, the polyolefin is a blend of olefin block copolymers.

In one embodiment the polyolefin is an ethylene-based polymer. Nonlimiting examples of ethylene-based polymers include ethylene/α-olefin copolymers and ethylene/α-olefin block copolymers.

The polyolefin layer may be polar or non-polar. In an embodiment, the polyolefin layer is non-polar.

Nonlimiting examples of a suitable polyolefin layer include a film, a sheet and a fabric. In an embodiment, the polyolefin layer is a film. In an embodiment, the polyolefin layer is a fabric made of polyolefin fibers.

In an embodiment, the polyolefin layer is the same as the substrate. In another embodiment, the polyolefin layer is compositionally distinct from the substrate.

In an embodiment, the polyolefin layer includes the same polyolefin as the functionalized polyolefin in the primer composition. In an embodiment, the polyolefin layer includes a polyolefin that is not functionalized.

In an embodiment, the polyolefin layer is pigmented or un-pigmented. The pigment may be organic or inorganic pigment.

In an embodiment, the pigmented polyolefin layer contains from greater than 0 wt % or 20 wt %, 40 wt % or 50 wt % to 60 wt %, 70 wt %, or 80 wt % of a pigment, based on the weight of the polyolefin layer. In an embodiment, the pigmented polyolefin layer contains 60 wt % pigment, based on the weight of the polyolefin layer.

In an embodiment, the polyolefin layer contains a filler. Nonlimiting examples of fillers include carbon black, calcium carbonate, clays, talc, silica, coal fly ash and any natural or synthetic, inorganic or organic compounds such as zeolite, magnesium hydroxide, titanium dioxide, aluminum hydroxide.

In an embodiment, the polyolefin layer has a total thickness of from 10 μm, 125 μm, 175 μm, or 250 μm to 760 μm, 1000 μm, 1900 μm, or 2500 μm.

The present polyolefin layer may comprise two or more embodiments discussed herein.

I. Article

The invention provides an article, which includes at least one component formed from the primer composition disclosed herein.

In an embodiment, the primer composition is applied to the substrate. Nonlimiting examples of suitable methods to apply the primer composition to the substrate include drawdown, rod coating, brushing, dipping, pouring or spraying techniques. In an embodiment, the primer composition is poured onto a substrate and spread out by means of a coating bar or grooved (wound) rod.

In an embodiment, one side of the substrate is coated with the primer composition. In an embodiment, two opposite sides of the substrate are coated with the primer composition. In an embodiment, the entire substrate is coated with the primer composition.

Advantageously, the primer composition has sufficient penetration into a substrate and wets with high adhesion (e.g., a peel strength greater than 20 N/25 mm for articles with a PET fabric substrate, or a peel strength greater than 50 N/25 mm for articles with a nylon substrate) for difficult-to-bond substrates.

In an embodiment, the article has a total thickness of from 25 μm, 50 μm, 100 μm, 200 μm, 300 μm, 400 μm or 500 μm to 600 μm, 1000 μm, 2000 μm, 3000 μm, 4000 μm, 5000 μm, 6000 μm, 7000 μm or 8000 μm.

In an embodiment, the present disclosure provides an adhesive layer. An "adhesive layer" is formed from the dried primer composition including a functionalized styrenic block copolymer, a functionalized polyolefin, and an isocyanate component (and no, or substantially no, solvent).

In an embodiment, the primer composition is dried after it is applied to the substrate to evaporate at least 90 wt %, or 98 wt %, or 99 wt %, or 100 wt % of the solvents, based on the weight of the solvent composition in the primer composition, to form an adhesive layer. In an embodiment, 100 wt % of the solvents are evaporated, based on the weight of the solvent composition in the primer composition.

The primer composition may be dried to form the adhesive layer. Nonlimiting examples of methods to dry the primer composition after it has been applied to the substrate include drying the article in an oven at a temperature greater than 100° C., or temperature of at least 130° C., or temperature of at least 150° C. for at least 0.5 minutes, at least 1 minute, at least 2 minutes or at least 3 minutes.

In an embodiment, the primer composition is applied to the substrate and dried in an oven at a temperature greater than or equal to 100° C. for at least 3 minutes to produce the adhesive layer.

In an embodiment, the coating, and further the adhesive layer, has a coat weight after drying of from 1 g/m$^2$, 5 g/m$^2$, 7 g/m$^2$, 10 g/m$^2$, 15 g/m$^2$, 18 g/m$^2$, 20 g/m$^2$, 21 g/m$^2$, 22 g/m$^2$, 23 g/m$^2$ or 25 g/m$^2$ to 30 g/m$^2$, 35 g/m$^2$, 40 g/m$^2$, 50 g/m$^2$, 80 g/m$^2$, 100 g/m$^2$, 150 g/m$^2$ or 200 g/m$^2$.

In an embodiment, the present article optionally includes a polyolefin layer including a polyolefin. In an embodiment, the polyolefin layer is at least partially in contact with the coating, such as the adhesive layer, formed from the primer composition.

The polyolefin layer is applied to the article including a substrate and a coating, such as an adhesive layer, formed from the primer composition. In an embodiment, the article including a substrate and a coating, such as an adhesive layer, formed from a primer composition is thermo-plastically coated with a polyolefin by extrusion coating or lamination with a preformed film.

In an embodiment, the article has a peel strength of greater than or equal to 20 N/25 mm, or 30 N/25 mm, or 40 N/25 mm, or 50 N/25 mm, or 55 N/25 mm, or 60 N/25 mm, or 65 N/25 mm to less than or equal to 70 N/25 mm, or 75 N/25 mm, or 80 N/25 mm, or 85 N/25 mm, or 90 N/25 mm, or 100 N/25 mm, measured in accordance with the T-Peel Test described below. In a further embodiment, the article has a peel strength of greater than or equal to 50 N/25 mm. In another embodiment, the article is formed from a substrate, a film layer, and a component formed from the primer composition, such as an adhesive layer, that is located between the substrate and the film layer, and no separation (either small separation or full separation) is observed between the substrate and the film layer during the T-Peel Test described below—instead, the film layer stretches.

Not wishing to be bound by a particular theory, Applicant believes some bonds/linkages are formed after the solvent is evaporated from the primer composition. After the primer composition is applied to the substrate and dried at a high temperature (greater than 100° C.), the solvents are evaporated and the isocyanate may react with —OH, or —COOH, or —NH$_2$ end-groups on the substrate. Additionally, the isocyanates may react with functional groups of the functionalized styrenic block copolymer or functionalized polyolefin. Specifically, the isocyanates may react with the maleic anhydride (MAH) or hydrolyzed maleic anhydride (di-acid) groups of the maleic-anhydride-functionalized styrenic block copolymer or maleic-anhydride-functionalized polyolefin. Moreover, isocyanate and functional groups of the functionalized styrenic block copolymer or functionalized polyolefin may have interactions (polar-polar, hydrogen bonding) with a polyolefin layer if such polyolefin layer contains any polar groups. Specifically, isocyanate and MAH or di-acid groups of the maleic-anhydride-functionalized styrenic block copolymer or maleic-anhydride-functionalized polyolefin may have interactions (polar-polar, hydrogen bonding) with a polyolefin layer if such polyolefin layer contains any polar groups.

In an embodiment, the article is a laminate.

Nonlimiting examples of articles include food packages, pipes, stretches, bottles, bags, synthetic leather, tarpaulins, conveyor belts, hoses, and tubes.

Improved adhesion can be achieved with the present primer composition, which allows use in technical applications such a synthetic leather, tarpaulins, conveyor belts, hoses, and tubes. Additional uses are footwear adhesives, adhesives to bond elastomers to metal, and over-molding of technical textiles with polyolefins.

In an embodiment, the article includes: (1) a substrate; and (2) at least one component formed from a primer composition comprising:
  (A) a functionalized styrenic block copolymer comprising greater than, or equal to, 20 wt % polymerized styrene;
  (B) a functionalized ethylene/α-olefin interpolymer;
  (C) a solvent composition comprising a hydrocarbon solvent; and
  (D) an isocyanate component selected from the group consisting of (i) an isocyanate compound, (ii) an isocyanate end-capped pre-polymer and (iii) combinations thereof; and
  (3) a film layer at least partially in contact with the component formed from the primer composition.

In an embodiment, the article includes:
  (1) a substrate composed of a polyamide fabric, such as a nylon fabric;
  (2) an adhesive layer on the substrate, the adhesive layer formed from a primer composition, the adhesive layer comprising:
    (A) a functionalized styrenic block copolymer comprising greater than, or equal to, 20 wt % polymerized styrene;
    (B) a functionalized ethylene/α-olefin interpolymer;
    (C) no, or substantially no solvent; and
    (D) an isocyanate component selected from the group consisting of (i) an isocyanate compound, (ii) an isocyanate end-capped pre-polymer and (iii) combinations thereof; and
  (3) a polyolefin film layer at least partially in contact with the adhesive layer, wherein the article has a peel strength from 50 N/25 mm, or 55 N/25 mm to 100 N/25 mm.

In an embodiment, the article includes:
  (1) a substrate composed of a polyester fabric, such as a PET fabric;
  (2) an adhesive layer on the substrate, the adhesive layer formed from a primer composition, the adhesive layer comprising:
    (A) a functionalized styrenic block copolymer comprising greater than, or equal to, 20 wt % polymerized styrene;
    (B) a functionalized ethylene/α-olefin interpolymer;
    (C) no, or substantially no, solvent; and
    (D) an isocyanate component selected from the group consisting of (i) an isocyanate compound, (ii) an isocyanate end-capped pre-polymer and (iii) combinations thereof; and
  (3) a polyolefin film layer at least partially in contact with the adhesive layer, wherein the article has a peel strength from 20 N/25 mm, or 45 N/25 mm, or 60 N/25 mm to 100 N/25 mm.

The present article may comprise two or more embodiments discussed herein.

Test Methods

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the Equation: % Crystallinity=$((H_f)/292$ J/g$)\times 100$.

The heat of fusion ($H_f$) and the peak melting temperature were reported from the second heat curve. Peak crystallization temperature was determined from the cooling curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, $T_c$, was determined from a DSC cooling curve as above except the tangent line was drawn on the high temperature side of the crystallization peak. Where this tangent intersects the baseline is the extrapolated onset of crystallization ($T_c$).

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Size-Exclusion Chromatograph (SEC) Method

Apparent molecular weight distributions (MWDs) of Kraton polymers were determined by size-exclusion chromatograph (SEC). The SEC system was based on a Waters Alliance 2695, operated at 1 mL/minute. The eluent was HPLC grade tetrahydrofuran (THF), which was continuously degassed with the online vacuum degasser within the Alliance 2695. The Waters Alliance 2695 was programmed to inject 50 microliters of sample solutions. The sample solution was prepared at a concentration of 2.0 mg/mL in THF. SEC separations were performed on a series of two, "7.5 mm (internal diameter)×300 mm (length)" PLgel Mixed-C columns from Agilent Technologies. The differential refractive index detector, within a Viscotek Model 302 triple detector array, was used for detection. Columns and detectors were operated at 35° C. SEC chromatograms were collected and reduced via OmniSEC software version 4.0 from Viscotek. Seventeen narrow PS molecular weight standards (Agilent Technologies), covering the molecular weight range from 3,742 kg/mol to 0.58 kg/mol were used for column calibration. The standards were prepared as cocktails at concentrations of 0.5 mg/mL each in THF. The calibration curve was the least squares fit to a third order polynomial. Molecular weight distributions were calculated from the DRI detector chromatogram, and the PS calibration curve under the assumption of constant refractive index increment across the SEC chromatogram. All references to molecular weight are not absolute, but linear PS equiv. values.

Density was measured in accordance with ASTM D792, Method B. The result was recorded in grams (g) per cubic centimeter (g/cc or g/cm$^3$).

Solution viscosity was measured in a solution of toluene and 25 wt % polymer at 25° C. in accordance with BAM 922. The result was recorded in Pa·s.

Brookfield viscosity was measured using a Brookfield DV-I Prime Viscometer. The spindle selection depends on the viscosity of the sample. For samples that were more viscous, or gelled, spindle TF96 was used. For samples that were less viscous, either spindle LV62 or LV63 was used. The viscosity measurement was recorded after 15 seconds at 23° C. The spindle was cleaned between measurements. Brookfield viscosity was measured at 100 rpm and was reported in centipoise (cP).

Melt index (MI) was measured in accordance with ASTM D1238, Condition 190° C./2.16 kilogram (kg) weight, also known as I$_2$, and was reported in g/10 min.

Melt Flow (MF) for the styrenic block copolymers was measured in accordance with ASTM D1238, Condition 200° C. or 230° C./5.0 kg weight and was reported in g/10 min.

NCO content by weight was measured in accordance with ASTM D5155.

Unit Weight (i.e., the weight of the fabric per square meter) was measured by cutting a "1 inch×5 inch" sample of fabric and weighing the fabric using an analytical balance in grams. Then, the unit weight was calculated by dividing the measured weight by the area and the result was reported in grams per square meter (g/m$^2$).

Coat weight was measured by weighing the dried coated fabric using an analytical balance in grams, and determining the difference between the weight of the fabric and the weight of the dried coated fabric. Then, the coat weight was calculated by dividing the measured weight difference by the areas and the result was reported in grams per square meter (g/m$^2$).

EXAMPLES

By way of example, and not limitation, examples of the present disclosure are provided. A summary of the materials used in the following examples is provided in Table 1.

TABLE 1

| Component | Details | Source |
|---|---|---|
| KRATON FG1901 G[1] (FG 1901 G) | maleic-anhydride grafted SEBS ([1] functionalized SEBS w/≥20 wt % styrene) (1.0 wt % MAH; 30 wt % styrene; Solution Viscosity* = 5 Pa•s; Melt Flow = 5 g/10 min @230° C./5.0 kg; M$_w$ = 78,163 g/mol; M$_w$/M$_n$ = 1.62) | Kraton Corporation |
| KRATON FG1924 G[2] (FG1924 G) | maleic-anhydride grafted SEBS ([2]functionalized SEBS w/<20 wt % styrene) (1.7 wt % MAH; 13 wt % styrene; Solution Viscosity* = 19 Pa•s; Melt Flow = 11 g/10 min @230° C./5.0 kg; M$_w$ = 138,354 g/mol; M$_w$/M$_n$ = 1.96) | Kraton Corporation |
| KRATON G1652 M[3] (G1652 M) | SEBS (30 wt % styrene; Solution Viscosity* = 0.4-0.5 Pa•s; Melt Flow = 6 g/10 min @230° C./5.0 kg; M$_w$ = 78,606 g/mol; M$_w$/M$_n$ = 1.06)([3]non-functionalized SEBS) | Kraton Corporation |
| KRATON D1161 P[4] (D1161 P) | SIS (15 wt % styrene; Solution Viscosity* = 0.9 Pa•s; Melt Flow = 23 g/10 min @200° C./5.0 kg; M$_w$ = 191,542 g/mol; M$_w$/M$_n$ = 1.20)([4]non-functionalized SIS) | Kraton Corporation |
| AMPLIFY GR 216 (GR 216) | maleic-anhydride-functionalized ethylene/octene copolymer (>0.5 wt % MAH; Density = 0.875 g/cc; Melt Index = 1.3 g/10 min @ 190° C./2.16 kg; T$_m$ = 62.8° C.; T$_g$ = −53.9° C.) | The Dow Chemical Company |
| AFFINITY PT 1450G1 (PT 1450G1) | ethylene/octene copolymer (Density = 0.902 g/cc; Melt Index = 7.5 g/10 min@ 190° C./2.16 kg; T$_m$ = 97.8° C.) | The Dow Chemical Company |
| Solvent | toluene | Sigma-Aldrich |
| Solvent | methylcyclohexane | Sigma-Aldrich |
| Solvent | cyclohexanone | Sigma-Aldrich |
| Solvent | methyl ethyl ketone | Sigma-Aldrich |
| Solvent | ethyl acetate | Sigma-Aldrich |
| PAPI-27 | Polymethylene polyphenylisocyanate containing methylene di-p-phenylene isocyanate (MDI) (isocyanate compound) (NCO content by weight = 31.4%) | The Dow Chemical Company |
| ISONATE 181 | MDI Prepolymer; reaction product of diphenylmethane diisocyanate and glycol (isocyanate end-capped pre-polymer) (NCO content by weight = 22.90 to 23.40 %) | The Dow Chemical Company |

TABLE 1-continued

| Component | Details | Source |
|---|---|---|
| DESMODUR RFE (27/73 blend) | 27 wt % tris (p-isocyanatophenyl) thiophosphate (isocyanate compound) (NCO content by weight = 7.2 ± 0.2%) 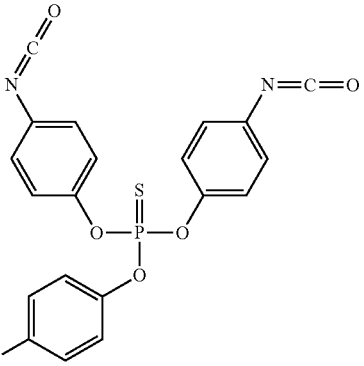 73 wt % ethyl acetate (polar solvent) | Bayer MaterialScience |
| VORANATE T-80 (T-80) | 80:20 blend of the 2, 4, and 2, 6 isomers of toluene diisocyanate (TDI) (isocyanate compound) 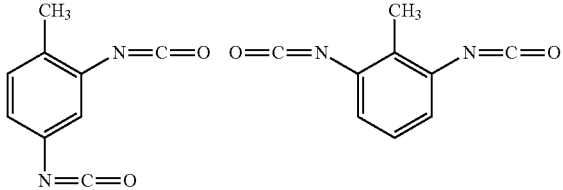 | The Dow Chemical Company |
| IPDI | Isophorone Diisocyanate (IPDI) (isocyanate compound) (NCO content by weight = 37.5 to 37.8%) 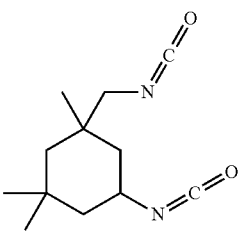 | Vencorex Chemicals |
| Nylon Fabric Substrate | polyamide nylon fabric (woven utility fabric; 100 wt % nylon (RN# 35055, available from JoAnn Fabrics); red-color; thickness = 160 μm; unit weight = 98 g/m$^2$) | JoAnn Fabrics |
| PET Fabric Substrate | Type III architecture fabric; white-color, thickness = 502 μm; unit weight = 360 g/m$^2$ | Stotorp |

*Solution viscosity-25wt % polymer in Toluene @ 25° C. (Pa•s)
**Melt Index may be calculated from the following equation (see USP 6,335,410): $I_2(190° C./2.16 kg) = 3.6126[10^{(log(\eta)-6.6928)/-1.1363}] - 9.318151$, where $\eta$ = melt viscosity, in cP, at 350° F. (177° C.). Melt viscosity at 177° C. = 13,000 cP.

1. Preparation of Primer Compositions

A. Preparation of Pre-Primer Composition

Pre-Primer compositions are prepared using three separate methods.

Cold Blending (solution blending at room temperature (22° C.)): A given amount of solvent was weighed into two 2 L, 3-necked, round-bottom glass flasks in the hood. After attaching a reflux condenser and an over-head mechanical stirrer, functionalized styrenic block copolymer (or comparative non-functionalized styrenic block copolymer) was added to one flask under a slow agitation, to form an 8-20 wt % single-polymer solution. To the other flask, functionalized ethylene/α-olefin interpolymer was added under a slow agitation, to form an 8-20 wt % single-polymer solution. A given amount of each single-polymer solution was weighed into a 100 ml plastic container, using an analytical balance in a hood, and then the mixture was mixed in a Speedy Mixer at a speed of 3000 rpm for 30 seconds at 22° C. Mixing the first single-polymer solution with the second single-polymer solution produces a uniform solution that is the pre-primer composition. The pre-primer compositions of Tables 2 and 3 were each prepared using cold blending. Examples 2A, 3A, 33A and 25A of Table 4 were prepared using cold blending.

Hot Blending (solution blending at high temperature (80° C.)): A solvent/functionalized or non-functionalized styrenic block copolymer single-polymer solution and a solvent/functionalized ethylene/α-olefin interpolymer single-polymer solution were formed as discussed above (see Cold Blending). A given amount of each single-polymer solution was weighed into a glass bottle. Then, the mixture was heated to 80° C., in a water bath, for two hours, under magnetic stirring. Cooling to room temperature (22° C.) on a bench produces a uniform solution that is the pre-primer composition. Examples 24A and 26A of Table 4 were prepared using hot blending.

Polymer Pellets Blending: A given amount of solvent was weighed into a 2 L, 3-necked, round-bottom glass flask in the hood. After attaching a reflux condenser and an overhead mechanical stirrer, polymer pellets (a blend of both styrenic block copolymer (functionalized or non-functionalized) pellets and functionalized ethylene/α-olefin interpolymer pellets) were added under a slow agitation, to form an 8-20 wt % polymer mixture. This outlet was then capped with a thermocouple, and the flask was heated. Once the temperature reached 80° C., the solution was mixed for two hours, to form a homogeneous polymer solution (8-20 wt % polymer). The heat was then turned off, and the pre-primer composition was cooled to 60° C. Next, the pre-primer composition was transferred into a glass container. Finally, the pre-primer composition was slowly cooled to room temperature (22° C.) on a bench. Example 23A of Table 4 was prepared using polymer pellets blending.

The Brookfield Viscosity of the pre-primer compositions was measured and is reported in Tables 2, 3 and 4.

B. Preparation of Primer Composition

To prepare the primer composition, 10 g of the above-made pre-primer compositions were weighed into a glass vial. Then, a given amount of an isocyanate component was added and mixed by a spatula for 3 to 5 minutes to make a uniform mixture. See Tables 2, 3 and 4 for each primer composition formulation and its properties.

2. Preparation of Article (Coating) and Evaluation

A. Coating and Drying of Coated Fabrics

The nylon fabric and PET fabric were coated manually in the lab by pouring approximately 10 g of the primer composition onto a "15.24 cm×15.24 cm" ("6 in.×6 in.") sheet of the fabric. The primer composition was spread out by means of a coating bar or grooved (wound) rod. The coating bar or grooved (wound) rod may remove some excess amount of primer composition. The fabric coated with primer composition was dried in an oven at 100° C. for three minutes to form an adhesive layer on the fabric. The coat weight was measured. A typical coat weight is approximately 10-30 g/m² (after drying). Only one side of the fabric was coated. The coat weight of the adhesive layers (dried primer compositions) applied to the fabric is provided in Tables 2, 3 and 4. The articles of Tables 2 and 4 include a nylon fabric substrate and the articles of Table 3 include a PET fabric substrate.

B. Preparation of Polyolefin Layer

AFFINITY® PT 1450G1 Clear, Un-Pigmented Film. This polyolefin film was produced on a monolayer Collin cast film line at a targeted thickness of approximately 20 mils (0.508 mm). Barrel temperatures were set between 140° C. and 200° C., depending on the zone and the melt index (MI) of the material used. Lower temperatures were used toward the hopper. The screw speed was set at 64 rounds per minute (rpm) and the amps at 3.2 A. Backpressure was maintained at 19 bar, with a feed rate of approximately 7.5 kg/hr, depending on the material extruded. Die temperatures were set at 190° C. The chill roll weight was set at 20 N and the take-off speed is 4 m/min. The thickness of the produced film is 390 μm.

C. Compression Lamination Procedure—Coated Fabric with POE Film

After the fabric was coated with a primer composition and dried, the primed fabric surface was covered with a "15.24 cm×15.24 cm" polyolefin (POE) film to form an article, a pre-laminate structure. At one end of the pre-laminate structure, a release liner (TEFLON film) was placed to provide a "2.45 cm×15.24 cm" area at one end of the pre-laminate structure that was not bonded. The POE sheet was partially in contact with the adhesive layer formed from the primer composition and the total bond area was "12.7 cm×15.24 cm" The article was then placed between two silicone or Teflon sheets. Next, the article was put into a press (PHI—Pasadena Hydraulics, Inc.) at 160° C. for two minutes preheating and four minutes pressing at the lowest possible pressure, to form the laminate. Finally, the laminate was taken out of the press and cooled to ambient temperature. The laminated samples were stored at least 24 hours. The peel strength was tested after one day (after 24 hours).

D. Adhesion Testing—T-Peel Test

The laminate was cut into "2.45 cm×15.24 cm" strips (each strip had a bond area of "2.45 cm×12.7 cm") and conditioned at 23° C. and a relative humidity of 40% to 50% for 24 hours for the T-peel adhesion test. A TA XT Plus Texture Analyzer from Stable Microsystems was used to peel apart the POE film and the fabric at room temperature (23° C.), at speed of 5.08 cm/min, and grip distance of 20 mm. The release liner was removed from each strip, and the free ends of the test sample were inserted into the clamps of the test machine. The average peel strength (Newtons per 25 millimeter (N/25 mm)) was determined from the force versus distance profile. Two or three test samples were tested and the average "average peel strength" reported.

The adhesion between the nylon fabric and the polyolefin film layer with various primer compositions applied between the nylon fabric and polyolefin film layer is provided in Tables 2 and 4. The adhesion between the PET fabric and the polyolefin film layer with various primer compositions applied between the PET fabric and polyolefin film layer is provided in Table 3.

The primer composition is used to bond the fabric and POE film of the laminate together. If the two bonded pieces separate or peel apart during T-peel testing, it indicates the primer composition fails to provide sufficient bonding, which is undesirable. Sufficient bonding is demonstrated by cohesive failure, which is shown by POE film stretching during the T-Peel test, opposed to adhesive failure, which is exhibited by separation of the POE film and the substrate during the T-Peel test. In some instances, a small amount of separation (i.e., not complete separation) is observed, while in other instances complete (i.e., full) separation is observed—each undesirable. If the POE film stretches during T-peel testing, it indicates the bonding is so strong that the two bonded pieces cannot be separated—a desirable result. Laminate separation or POE film stretching is provided in Tables 2 and 4.

In Tables 2, 3 and 4, pre-primer compositions are denoted with the letter "A," primer compositions are denoted with the letter "B," fabrics coated with primer composition and dried are denoted with the letter "C," and laminate articles formed from POE film and the fabrics coated with primer composition are denoted with the letter "D." By way of explanation, primer composition Ex. 2B of Table 2 includes pre-primer composition Ex. 2A; coated nylon fabric Ex. 2C is coated with primer composition Ex. 2B and dried; and laminate article Ex. 2D includes a POE film and coated nylon fabric Ex. 2C—thus, Ex. 2 constitutes Ex. 2A, Ex. 2B, Ex. 2C and Ex. 2D.

3. Results and Discussion

Primer compositions containing functionalized polyolefin (AMPLIFY® GR 216) and a solvent (CS 18B, CS 20B CS 21B, CS 27B, and CS 30B), and containing no functionalized styrenic block copolymer, cannot be coated onto a fabric because their viscosity is too high (i.e., above 9,000 cP). The addition of functionalized styrenic block copolymer (Kraton® FG1901 G) into pre-primer compositions containing functionalized polyolefin (AMPLIFY® GR 216) and a solvent decreases the viscosity of the pre-primer composition compared to pre-primer compositions containing functionalized polyolefin and solvent only, and no functionalized styrenic block copolymer. For instance, Ex. 19A (a pre-primer composition containing functionalized styrenic block copolymer, functionalized polyolefin and solvent) has a pre-primer Brookfield Viscosity of 3,970 cP, while CS 21A (a pre-primer composition with functionalized polyolefin and solvent, and no functionalized styrenic block copolymer) has a significantly higher pre-primer Brookfield Viscosity of 24,604 cP. Lower viscosity is useful to provide a uniform coating on the fabric. The Brookfield Viscosity of the pre-primer composition is advantageously less than 5,000 cP, or less than 4,000 cP to enable the primer composition containing the pre-primer composition to be coated on a fabric.

Laminate articles with an adhesive layer formed from primer compositions containing non-functionalized styrenic block copolymer (Kraton® G1652 M), functionalized polyolefin, solvent and an isocyanate component (CS 6D, CS 7D) exhibit a small amount of separation between the nylon fabric and the polyolefin film layer during the T-peel test (tested 24 hours after laminate was produced). For articles with an adhesive layer formed from primer compositions containing non-functionalized styrenic block copolymers (Kraton® G1652 M and Kraton® D1161 P), functionalized polyolefin, solvent and an isocyanate component (CS 8D, CS 9D, CS 13D-CS 17D), or articles with an adhesive layer formed from primer compositions containing functionalized styrenic block copolymer with 13 wt % styrene (Kraton® FG1924 G), functionalized polyolefin (CS 10D-CS 12D), solvent and an isocyanate component, the nylon fabric and the polyolefin film layer completely separate (peel apart easily—very low adhesion). In contrast, articles with an adhesive layer formed from a primer composition with functionalized styrenic block polymer with 30 wt % styrene (Kraton® FG1901 G), functionalized polyolefin (AMPLIFY® GR 216), solvent and an isocyanate component (Ex. 2D-4D & Ex. 19D) advantageously do not separate—the polyolefin film stretches (deforms), as opposed to separating from the coated fabric. In these cases, the bonding strength is greater (higher) than the yield strength of the POE film.

Articles made of nylon fabric with an adhesive layer formed from a primer composition containing functionalized polyolefin (AMPLIFY® GR 216), solvent, an isocyanate component, and either non-functionalized styrenic block copolymers (Kraton® G1652 M and Kraton® D1161 P) (CS 6D-8D, CS 14D-16D) or functionalized styrenic block copolymers with less than 20 wt % styrene (Kraton® FG1924 G) (CS 10D-12D) do not have sufficient bonding strength with a polyolefin (AFFINITY® PT 1450G1) film (i.e., greater than the yield strength of the POE film— evidenced by POE film stretching instead of separating from the nylon fabric), as shown in Table 2. It has been discovered that articles made of nylon fabric and an adhesive layer formed from a primer composition containing functionalized polyolefin (AMPLIFY® GR 216), functionalized styrenic block copolymer with 30 wt % styrene (Kraton® FG1901 G), solvent and an isocyanate component (DESMODUR RFE) have excellent bonding strength (i.e., greater than the yield strength of the POE film—evidenced by POE film stretching instead of separating from the nylon fabric) with the same polyolefin (AFFINITY® PT 1450G1) film, as demonstrated by Ex. 2D, Ex. 3D, Ex. 4D and Ex. 19D of Table 2. Articles Ex. 2D, Ex. 3D, Ex. 4D and Ex. 19D advantageously exhibit a peel strength of 58.8 N/25 mm or greater.

As shown in Table 3, a pre-primer composition with functionalized polyolefin (AMPLIFY® GR 216), and solvent (and no functionalized styrenic block copolymer), exhibits a viscosity of 24,604 cP, which prevents the primer composition formed from the pre-primer composition from being coated onto a substrate (CS 27B). An article containing a PET fabric substrate, a polyolefin (AFFINITY® PT 1450G1) film, and an adhesive layer formed from a primer composition with functionalized styrenic block polymer with 30 wt % styrene (Kraton® FG1901 G), solvent and an isocyanate component, and no functionalized polyolefin exhibits a low peel strength of 30.4 N/25 mm (CS 29D). Advantageously, a primer composition containing functionalized styrenic block polymer with 30 wt % styrene (Kraton® FG1901 G), functionalized polyolefin (AMPLIFY® GR 216), solvent and an isocyanate component can be coated onto a PET substrate, and form an article with a polyolefin (AFFINITY® PT 1450G1) film that exhibits a peel strength of 61.8 N/25 mm (Ex. 28B, 28D). Improved (i.e., higher) peel strength is exhibited in articles with an adhesive layer formed from primer compositions containing isocyanate compounds and isocyanate end-capped pre-polymers (Ex. 2D-4D, 19D and 32D-36D).

TABLE 2

Primer Compositions (Cold Blending) Containing an Isocyanate Compound and Articles with Nylon Fabric Substrate<sup>◇</sup>

|  | CS 1 | Ex 2 | Ex 3 | Ex 4 | CS 5 | CS 6 | CS 7 | CS 8 | CS 9 | CS 10 | CS 11 |
|---|---|---|---|---|---|---|---|---|---|---|---|
| Pre-Primer Compositions | | | | | | | | | | | |
|  | CS 1A | Ex 2A | Ex 3A | Ex 4A | CS 5A | CS 6A | CS 7A | CS 8A | CS 9A | CS 10A | CS 11A |
| FG1901 G[1] | — | 3.2 | 7.3 | 12.5 | 19.3 | — | — | — | — | — | — |
| FG1924 G[2] | — | — | — | — | — | — | — | — | — | 3.2 | 7.3 |
| G1652 M[3] | — | — | — | — | — | 3.2 | 7.3 | 12.5 | 19.3 | — | — |
| D1161 P[4] | — | — | — | — | — | — | — | — | — | — | — |
| GR 216 | 11.7 | 9.8 | 7.3 | 4.2 | — | 9.8 | 7.3 | 4.2 | — | 9.8 | 7.3 |

TABLE 2-continued

Primer Compositions (Cold Blending) Containing an Isocyanate Compound and Articles with Nylon Fabric Substrate◊

| | CS 1B | Ex 2B | Ex 3B | Ex 4B | CS 5B | CS 6B | CS 7B | CS 8B | CS 9B | CS 10B | CS 11B |
|---|---|---|---|---|---|---|---|---|---|---|---|
| Toluene | — | — | — | — | — | — | — | — | — | — | — |
| Methylcyclohexane | 81.7 | 80.4 | 78.6 | 76.2 | 73.2 | 80.4 | 78.6 | 76.2 | 73.2 | 80.4 | 78.6 |
| Cyclohexanone | 4.3 | 4.2 | 4.1 | 4.0 | 3.9 | 4.2 | 4.1 | 4.0 | 3.9 | 4.2 | 4.1 |
| Pre-Primer Final Solids (wt %) | 12.0 | 13.6 | 15.3 | 17.6 | 20.3 | 13.6 | 15.3 | 17.6 | 20.3 | 13.6 | 15.3 |
| Pre-Primer Brookfield Visc (cP) | 1245 | 1192 | 926 | 784 | 891 | 876 | 409 | 435 | 915 | 1392 | 1380 |

Primer Compositions

| | CS 1B | Ex 2B | Ex 3B | Ex 4B | CS 5B | CS 6B | CS 7B | CS 8B | CS 9B | CS 10B | CS 11B |
|---|---|---|---|---|---|---|---|---|---|---|---|
| DESMODUR RFE* - ethyl acetate | 1.7 | 1.8 | 2.0 | 2.2 | 2.6 | 1.8 | 2.0 | 2.2 | 2.6 | 1.8 | 2.0 |
| DESMODUR RFE* - tris (p-isocyanatophenyl) thiophophate | 0.6 | 0.6 | 0.7 | 0.9 | 1.0 | 0.6 | 0.7 | 0.9 | 1.0 | 0.6 | 0.7 |
| Total Primer (wt %): | 100 | 100 | 100 | 100 | 100 | 100 | 100 | 100 | 100 | 100 | 100 |

Nylon Fabric Coated with Primer Composition and Oven Dried to form an Adhesive Layer on the Fabric

| | CS 1C | Ex 2C | Ex 3C | Ex 4C | CS 5C | CS 6C | CS 7C | CS 8C | CS 9C | CS 10C | CS 11C |
|---|---|---|---|---|---|---|---|---|---|---|---|
| Primer Coat Weight after Drying (g/m²) | 18 | 30 | 28 | 27 | 22 | 14 | 20 | 18 | 30 | 27 | 20 |

Laminate Article: Nylon Fabric Substrate/Adhesive Layer/POE Film (After Drying)

| | CS 1D | Ex 2D | Ex 3D | Ex 4D | CS 5D | CS 6D | CS 7D | CS 8D | CS 9D | CS 10D | CS 11D |
|---|---|---|---|---|---|---|---|---|---|---|---|
| Peel Strength (N/25 mm) | >56.9 | >59.8 | >61.8 | >65.7 | >57.9 | 58.8 | 47.1 | 18.6 | 9.8 | 47.1 | 49.0 |
| Separation or Stretch■ | | STCH | STCH | STCH | | S-S | S-S | F-S | F-S | F-S | F-S |

| | CS 12 | CS 13 | CS 14 | CS 15 | CS 16 | CS 17 | CS 18 | Ex 19 | CS 20 | CS 21 |
|---|---|---|---|---|---|---|---|---|---|---|

Pre-Primer Compositions

| | CS 12A | CS 13A | CS 14A | CS 15A | CS 16A | CS 17A | CS 18A | Ex 19A | CS 20A | CS 21A |
|---|---|---|---|---|---|---|---|---|---|---|
| FG1901 G[1] | — | — | — | — | — | — | — | 2.5 | — | — |
| FG1924 G[2] | 12.5 | 19.3 | — | — | — | — | — | — | — | — |
| G1652 M[3] | — | — | — | — | — | — | — | — | — | — |
| D1161 P[4] | — | — | 3.2 | 7.3 | 12.5 | 19.3 | — | — | — | — |
| GR 216 | 4.2 | — | 9.8 | 7.3 | 4.2 | — | 12 | 10.1 | 9.8 | 7.9 |
| Toluene | — | — | — | — | — | — | 88 | 85 | 88.3 | 90.6 |
| Methylcyclohexane | 76.2 | 73.2 | 80.4 | 78.6 | 76.2 | 73.2 | — | — | — | — |
| Cyclohexanone | 4.0 | 3.9 | 4.2 | 4.1 | 4.0 | 3.9 | — | — | — | — |
| Pre-Primer Final Solids (wt %) | 17.6 | 20.3 | 13.6 | 15.3 | 17.6 | 20.3 | 12.0 | 13.0 | 10.3 | 8.3 |
| Pre-Primer Brookfield Visc (cP) | 1458 | 1854 | 2351 | 940 | 1554 | 498 | Gel | 3970 | Gel | 24604 |

Primer Compositions

| | CS 12B | CS 13B | CS 14B | CS 15B | CS 16B | CS 17B | CS 18B | Ex 19B | CS 20B | CS 21B |
|---|---|---|---|---|---|---|---|---|---|---|
| DESMODUR RFE* - ethyl acetate | 2.2 | 2.6 | 1.8 | 2.0 | 2.2 | 2.6 | — | 1.7 | 1.4 | 1.1 |
| DESMODUR RFE* - tris (p-isocyanatophenyl) thiophophate | 0.9 | 1.0 | 0.6 | 0.7 | 0.9 | 1.0 | — | 0.6 | 0.5 | 0.4 |
| Total Primer (wt %): | 100 | 100 | 100 | 100 | 100 | 100 | 100 | 100 | 100 | 100 |

TABLE 2-continued

Primer Compositions (Cold Blending) Containing an Isocyanate Compound and Articles with Nylon Fabric Substrate[◇]

Nylon Fabric Coated with Primer Composition and Oven Dried to form an Adhesive Layer on the Fabric

|  | CS 12C | CS 13C | CS 14C | CS 15C | CS 16C | CS 17C | CS 18C | Ex 19C | CS 20C | CS 21C |
|---|---|---|---|---|---|---|---|---|---|---|
| Primer Coat Weight after Drying (g/m²) | 18 | 35 | 16 | 20 | 18 | 19 | Ø | 22 | Ø | Ø |

Laminate Article: Nylon Fabric Substrate/Adhesive Layer/POE Film (After Drying)

|  | CS 12CD | CS 13CD | CS 14D | CS 15D | CS 16D | CS 17D | CS 18D | Ex 19D | CS 20D | CS 21D |
|---|---|---|---|---|---|---|---|---|---|---|
| Peel Strength (N/25 mm) | 42.2 | 40.2 | 37.3 | 22.6 | 21.6 | 17.7 | Ø | >58.8 | Ø | Ø |
| Separation or Stretch■ | F-S | F-S | F-S | F-S | F-S | F-S | Ø | STCH | Ø | Ø |

CS = Comparative Sample
[◇] Weight percents are based on the total weight percent of the primer compositions, which includes the pre-primer composition and the isocyanate component.
[1] functionalized SEBS with 30 wt % styrene.
[2,3,4] Comparative styrenic block copolymers ([2] functionalized SEBS w/ <20 wt % styrene) ([3] non-functionalized SEBS) ([4] non-functionalized SIS).
*DESMODUR RFE is added as a solution containing 27 wt % tris (p-isocyanatophenyl) thiophosphate and 73 wt % ethyl acetate. The components are listed separately to indicate the amount of tris (p-isocyanatophenyl) thiophosphate and ethyl acetate in the entire primer composition. The total amount of DESMODUR RFE contained in the primer composition is the combined amount of the tris (p-isocyanatophenyl) thiophosphate and ethyl acetate components.
■S-S = small separation of fabric and POE film during T-peel test; F-S = full separation of fabric and POE film during T-peel test; STCH = stretch of POE film (no separation with fabric) during T-peel test.
Ø = the viscosity of the primer composition was too high to be coated onto the fabric.

TABLE 3

Primer Compositions (Cold Blending) Containing Different Isocyanate Components and Articles with PET Fabric Substrate[◇]

|  | CS 27 | Ex 28 | CS 29 | CS 30 | CS 31 | Ex 32 | Ex 33 | Ex 34 | Ex 35 | Ex 36 |
|---|---|---|---|---|---|---|---|---|---|---|

Pre-Primer Compositions

|  | CS 27A | Ex 28A | CS 29A | CS 30A | CS 31A | Ex 32A | Ex 33A | Ex 34A | Ex 35A | Ex 36A |
|---|---|---|---|---|---|---|---|---|---|---|
| Kraton FG1901 G[1] | — | 4 | 7.9 | — | 2.4 | 4.8 | 1.9 | 1.9 | 1.9 | 1.9 |
| Amplify GR 216 | 7.9 | 4 | — | 7.9 | 5.5 | 4.8 | 7.6 | 7.6 | 7.6 | 7.6 |
| Toluene | 81.6 | 81.6 | 81.6 | 90.7 | 90.7 | — | — | — | — | — |
| Methylcyclohexane | — | — | — | — | — | 81.4 | 81.4 | 81.4 | 81.4 | 81.4 |
| Cyclohexanone | — | — | — | — | — | 4.3 | 4.3 | 4.3 | 4.3 | 4.3 |
| Methyl Ethyl Ketone | 9.1 | 9.1 | 9.1 | — | — | — | — | — | — | — |
| Ethyl Acetate | — | — | — | — | — | — | 4.3 | 4.3 | 4.3 | 4.3 |
| Pre-Primer Final Solids (wt %) | 8.3 | 8.4 | 8.3 | 8.3 | 8.3 | 10.0 | 10.0 | 10.0 | 10.0 | 10.0 |
| Pre-Primer Brookfield Viscosity (cP) | 24604 | 1851 | 16.8 | 29348 | 3935 | 149 | 1125 | 1125 | 1125 | 1125 |

Primer Compositions

|  | CS 27B | Ex 28B | CS 29B | CS 30B | CS 31B | Ex 32B | Ex 33B | Ex 34B | Ex 35B | Ex 36B |
|---|---|---|---|---|---|---|---|---|---|---|
| DESMODUR RFE* - ethyl acetate | 1.1 | 1.1 | 1.1 | 1.1 | 1.1 | 4.3 | — | — | — | — |
| DESMODUR RFE* - tris (p-isocyanatophenyl) thiophosphate | 0.4 | 0.4 | 0.4 | 0.4 | 0.4 | 0.5 | — | — | — | — |
| PAPI-27 | — | — | — | — | — | — | 0.5 | — | — | — |
| ISONATE 181 | — | — | — | — | — | — | — | 0.5 | — | — |
| VORANATE T-80 | — | — | — | — | — | — | — | — | 0.5 | — |
| IPDI | — | — | — | — | — | — | — | — | — | 0.5 |
| Total Primer (wt %): | 100 | 100 | 100 | 100 | 100 | 100 | 100 | 100 | 100 | 100 |

PET Fabric Coated with Primer Composition and Oven Dried to form an Adhesive Layer on the Fabric

|  | CS 27C | Ex 28C | CS 29C | CS 30C | CS 31C | Ex 32C | Ex 33C | Ex 34C | Ex 35C | Ex 36C |
|---|---|---|---|---|---|---|---|---|---|---|
| Primer Coat Weight after Drying (g/m²) | Ø | 18 | 19 | Ø | 19 | — | — | — | — | — |

TABLE 3-continued

Primer Compositions (Cold Blending) Containing Different Isocyanate Components and Articles with PET Fabric Substrate[◊]

|  | CS 27 | Ex 28 | CS 29 | CS 30 | CS 31 | Ex 32 | Ex 33 | Ex 34 | Ex 35 | Ex 36 |
|---|---|---|---|---|---|---|---|---|---|---|
| Laminate Article: PET Fabric Substrate/Adhesive Layer/POE Film (After Drying) | | | | | | | | | | |
|  | CS 27D | Ex 28D | CS 29D | CS 30D | CS 31D | Ex 32D | Ex 33D | Ex 34D | Ex 35D | Ex 36D |
| Peel Strength (N/25 mm) | Ø | 61.8 | 30.4 | Ø | 57.9 | >72.6 | >60.6 | 46.5 | 23.0 | 22.2 |

CS = Comparative Sample
[◊]Weight percents are based on the total weight percent of the primer compositions, which includes the pre-primer composition and the isocyanate component.
[1]functionalized SEBS with 30 wt % styrene.
*DESMODUR RFE is added as a solution containing 27 wt % tris (p-isocyanatophenyl) thiophosphate and 73 wt % ethyl acetate. The components are listed separately to indicate the amount of tris (p-isocyanatophenyl) thiophosphate and ethyl acetate in the entire primer composition. The total amount of DESMODUR RFE contained in the primer composition is the combined amount of the tris (p-isocyanatophenyl) thiophosphate and ethyl acetate components.
Ø = the viscosity of the primer composition was too high to be coated onto the fabric.

The present primer composition may advantageously be prepared at room temperature (i.e., via cold blending) to ease processability and lower production costs because, as shown in Table 4, the pre-primer composition blending procedure does not impact an article's adhesion. Article Examples 2D, 3D, 19D and 22D-26D, each containing an adhesive layer formed from a primer composition with functionalized styrenic block polymer (Kraton® FG1901 G), functionalized polyolefin (AMPLIFY® GR 216), solvent and an isocyanate component do not separate—the polyolefin film stretches.

TABLE 4

Impact of Primer Composition Blending Process on Article Peel Adhesion with Nylon Fabric Substrate[◊]

|  | Ex 2 | Ex 22 | Ex 23 | Ex 24 | Ex 3 | Ex 25 | Ex 26 |
|---|---|---|---|---|---|---|---|
| Pre-Primer Compositions | | | | | | | |
|  | Ex 2A | Ex 22A | Ex 23A | Ex 24A | Ex 3A | Ex 25A | Ex 26A |
| Pre-Primer Blending Process | Cold | Cold | Pellets | Hot | Cold | Cold | Hot |
| Kraton FG1901 G[1] | 3.2 | 3.2 | 3.2 | 3.2 | 7.3 | 7.3 | 7.3 |
| Amplify GR 216 | 9.8 | 9.8 | 9.8 | 9.8 | 7.3 | 7.3 | 7.3 |
| Methylcyclohexane | 80.4 | 80.4 | 80.4 | 80.4 | 78.6 | 78.6 | 78.6 |
| Cyclohexanone | 4.2 | 4.2 | 4.2 | 4.2 | 4.1 | 4.1 | 4.1 |
| Pre-Primer Final Solids (wt %) | 13.6 | | | | 15.3 | | |
| Pre-Primer Brookfield Viscosity (cP) | 1192 | | | | 926 | | |
| Primer Compositions | | | | | | | |
|  | Ex 2B | Ex 22B | Ex 23B | Ex 24B | Ex 3B | Ex 25B | Ex 26B |
| DESMODUR RFE* -ethyl acetate | 1.8 | 1.8 | 1.8 | 1.8 | 2.0 | 2.0 | 2.0 |
| DESMODUR RFE* -tris (p-isocyanatophenyl) thiophosphate | 0.6 | 0.6 | 0.6 | 0.6 | 0.7 | 0.7 | 0.7 |
| Total Primer (wt %): | 100 | 100 | 100 | 100 | 100 | 100 | 100 |
| Nylon Fabric Coated with Primer Composition and Oven Dried to form an Adhesive Layer on the Fabric | | | | | | | |
|  | Ex 2C | Ex 22C | Ex 23C | Ex 24C | Ex 3C | Ex 25C | Ex 26C |
| Primer Coat Weight after Drying (g/m²) | 30 | 28 | 18 | 19 | 28 | 27 | 20 |
| Laminate Article : Nylon Fabric Substrate/Adhesive Layer/POE Film (After Drying) | | | | | | | |
|  | Ex 2D | Ex 22D | Ex 23D | Ex 24D | Ex 3D | Ex 25D | Ex 26D |
| Peel Strength (N/25 mm) | >59.8 | >61.8 | >56.9 | >64.7 | >61.8 | >65.7 | >60.8 |
| Separation or Stretch[■] | STCH | STCH | STCH | STCH | STCH | STCH | STCH |

[◊]Weight percents are based on the total weight percent of the primer compositions, which includes the pre-primer composition and the isocyanate component.
[1]functionalized SEBS with 30 wt % styrene.
[■]S-S = small separation of fabric and POE film during T-peel test; F-S = full separation of fabric and POE film during T-peel test; and STCH = stretch of POE film (no separation with fabric) during T-peel test.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A primer composition comprising:
   (A) a functionalized styrenic block copolymer comprising greater than, or equal to, 20 wt % polymerized styrene;
   (B) a functionalized ethylene/α-olefin interpolymer;
   (C) a solvent composition comprising a hydrocarbon solvent; and
   (D) an isocyanate component selected from the group consisting of (i) an isocyanate compound, (ii) an isocyanate end-capped pre-polymer and (iii) combinations thereof.

2. The primer composition of claim 1, wherein the functionalized styrenic block copolymer comprises 20 wt % to 60 wt % polymerized styrene.

3. The primer composition of claim 1, wherein the functionalized styrenic block copolymer is selected from the group consisting of an anhydride-functionalized styrenic block copolymer, a carboxylic-acid-functionalized styrenic block copolymer, an hydroxy-functionalized styrenic block copolymer, an amine-functionalized styrenic block copolymer, and a combination thereof.

4. The primer composition of claim 1, wherein the functionalized ethylene/α-olefin interpolymer is selected from the group consisting of the an anhydride-functionalized ethylene/α-olefin interpolymer, a carboxylic-acid-functionalized ethylene/α-olefin copolymer, an hydroxy-functionalized ethylene/α-olefin copolymer, an amine-functionalized ethylene/α-olefin copolymer, and a combination thereof.

5. The primer composition of claim 1, wherein the hydrocarbon solvent is an aliphatic solvent.

6. The primer composition of claim 1, wherein the solvent composition further comprises 0.5 wt % to 20 wt % of a polar solvent, based on the total weight of the solvent composition.

7. The primer composition of claim 1, wherein the functionalized styrenic block copolymer is a maleic-anhydride-functionalized styrenic block copolymer comprising 20 wt % to 60 wt % polymerized styrene, the functionalized ethylene/α-olefin interpolymer is a maleic-anhydride-functionalized ethylene/octene copolymer, and the isocyanate component comprises the isocyanate compound.

8. The primer composition of claim 1, wherein the primer composition has a Brookfield Viscosity of 1,000 cP to 5,000 cP at 23° C.

9. An article comprising at least one component formed from the primer composition of claim 8.

10. The article of claim 9, wherein the article further comprises a substrate.

* * * * *